United States Patent
Park et al.

(10) Patent No.: US 12,169,649 B2
(45) Date of Patent: Dec. 17, 2024

(54) STORAGE DEVICE WITH IMPROVED READ-AHEAD PERFORMANCE AND OPERATION METHOD THEREOF

(71) Applicant: SK hynix Inc., Icheon-si (KR)

(72) Inventors: Chi Je Park, Icheon-si (KR); Jung Hyun Joh, Icheon-si (KR); Hyeong Jae Choi, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 18/347,497

(22) Filed: Jul. 5, 2023

(65) Prior Publication Data

US 2024/0231690 A1 Jul. 11, 2024

(30) Foreign Application Priority Data

Jan. 10, 2023 (KR) .................. 10-2023-0003460

(51) Int. Cl.
*G06F 12/00* (2006.01)
*G06F 3/06* (2006.01)
*G06F 12/02* (2006.01)

(52) U.S. Cl.
CPC .......... *G06F 3/0659* (2013.01); *G06F 3/061* (2013.01); *G06F 3/0673* (2013.01); *G06F 12/0215* (2013.01); *G06F 2212/1016* (2013.01)

(58) Field of Classification Search
CPC ...... G06F 3/0659; G06F 3/061; G06F 3/0673; G06F 12/0215; G06F 2212/1016; G06F 12/0862; G06F 2212/1008; G06F 2212/1024; G06F 2212/1041; G06F 2212/214; G06F 2212/507; G06F 2212/7204; G06F 3/0679; G06F 12/0868
See application file for complete search history.

(56) References Cited

U.S. PATENT DOCUMENTS

| | | | | |
|---|---|---|---|---|
| 6,412,041 | B1 * | 6/2002 | Lee | G11C 16/08 711/167 |
| 2007/0239926 | A1 * | 10/2007 | Gyl | G11C 7/1075 711/103 |
| 2018/0024772 | A1 * | 1/2018 | Madraswala | G06F 3/0679 711/103 |
| 2020/0117378 | A1 * | 4/2020 | Hsu | G06F 3/0659 |
| 2022/0206712 | A1 * | 6/2022 | Siciliani | G06F 3/061 |

* cited by examiner

*Primary Examiner* — Arvind Talukdar (57) ABSTRACT

A storage device includes a memory controller, including: a controller configured to receive a read command from an external device, determine whether the read command is a general read command or a read-ahead command; continue an erase operation or a program operation currently in progress if the read command is a read-ahead command; and temporarily suspend an erase operation or a program operation currently in progress and process the read command if the read command is a general read command.

13 Claims, 11 Drawing Sheets

| Bytes | Name |
|---|---|
| 03:00 | Command Dword 0 (CDW0) |
| 07:04 | Namespace Identifier (NSID) |
| 11:08 | Command Dword 2 (CDW2) |
| 15:12 | Command Dword 3 (CDW3) |
| 23:16 | Metadata Pointer (MPTR) |
| 30:24 | Data Pointer (DPTR) |
| 43:40 | Command Dword 10 (CDW10) |
| 47:44 | Command Dword 11 (CDW11) |
| 51:48 | Command Dword 12 (CDW12) |
| 55:52 | Command Dword 13 (CDW10) |
| 59:56 | Command Dword 14 (CDW14) |
| 63:60 | Command Dword 15 (CDW15) |

FIG. 4B

| Bytes | Name |
|---|---|
| 31:16 | Command Identifier (CID) |
| 15:14 | PRP or SGL for Data Transfer (PSDT) |
| 13:10 | Reserved ➡ 0101: read-ahead, 0000: read |
| 09:08 | Fused Operation (FUSE) |
| 07:00 | Opcode (OPC) |

FIG. 5

| | 31 30 29 28 27 26 25 24 | 23 22 21 20 19 18 17 16 | 15 14 13 12 11 10 9 8 | 7 6 5 4 3 2 1 0 |
|---|---|---|---|---|
| DW0 | Transaction Type | Flags | LUN | Task Tag |
| DW1 | Reserved | Command Set Type | Query function/Task Management Function | Response | Status |
| DW2 | Total EHS Length | Device Information | Data Segment Lenght | |
| DW3 | Transaction Specification Fields | | | |
| DW4 | Extra Header Segment 0 | | | |
| DWx | ... | | | |
| DWx | Extra Header Segment N | | | |
| DWx | Header E2ECRC | | | |
| DWx | Data Segment 0 | | | |
| DWx | ... | | | |
| DWx | Data Segment K | | | |
| DWx | Data E2ECRC | | | |

STORAGE DEVICE WITH IMPROVED READ-AHEAD PERFORMANCE AND OPERATION METHOD THEREOF

CROSS-REFERENCE TO RELATED APPLICATIONS

The present application claims the benefit of priority under 35 U.S.C. § 119(a) to Korea Patent Application No. 10-2023-0003460, filed Jan. 10, 2023 in the Korean Intellectual Property Office, the entire contents of which is incorporated herein for all purposes by this reference.

FIELD

Various embodiments relate to a storage device and methods for preventing performance degradation due to a read-ahead operation.

BACKGROUND

A storage device is a device capable of storing data based on a request from an external device such as a computer, a mobile terminal such as a smart phone or tablet, or various other electronic devices.

The storage device may include a memory device and a memory controller configured to control the memory device. The memory controller may receive a command from an external device, and may read data from the memory device based on the received command. Based on the received command, the memory controller may write/program data into the memory, or store data in the memory device, or execute or control operations for erasing data in the memory device.

In particular, in order to improve performance, the external device may transmit a read command for a read-ahead operation in order to read and temporarily store, in an internal memory, data that will be needed later. The storage device that receives the read command for this read-ahead operation, however, does not distinguish whether a read command from an external device is a general read command or a read-ahead command. As a result, the storage device treats all read commands from an external device the same. For example, the storage device may temporarily suspend an erase operation in progress and perform a read operation first, even if the read operation is a read-ahead operation for data to be used at a later time. Accordingly, the storage device may unnecessarily increase the time required for completing writing (programming).

Also, if the storage device is enabled to perform read-ahead operation for a read command received from the external device, the read-ahead operation may be redundantly performed, which may waste limited resources.

SUMMARY

The technical problem to be solved by the present disclosure is not limited to the case described above, but also to other technical problems that are not mentioned and are clearly understood by ordinarily-skilled persons in the art to which the present disclosure pertains, based on the following description.

According to one aspect of the present disclosure, a memory controller is configured to: receive a read command from an external device and determine whether the read command is a general read command or a read-ahead command; continue an erase operation or a program operation currently in progress if the read command is a read-ahead command; and temporarily suspend an erase operation or a program operation currently in progress and process the read command if the read command is a general read command.

According to another aspect of the present disclosure, a method for operating a memory controller includes: receiving a read command from an external device; determining whether the read command is a general read command or a read-ahead command; determining whether the memory controller is performing an erase operation or a program operation; and when the read command is a read-ahead command and the memory controller is performing an erase operation or a program operation as a result of determination, performing a read operation for a memory device according to the read command after the erase operation or program operation is completed.

In addition, according to various embodiments of the present disclosure, a method for operating a memory controller may further include: when the read command is a general read command and the memory controller is performing an erase operation or a program operation as a result of the determination, performing a read operation for a memory device according to the read command after temporarily suspending the erase operation or the program operation.

According to a further aspect of the present disclosure, a storage device may include: a non-volatile memory device; and a controller configured to control an erase operation, a program operation, and a read operation to be performed on the memory device; receive a read command from an external device and determine whether the read command is a general read command or a read-ahead command; continue an erase operation or a program operation currently in progress if the read command is a read-ahead command; and temporarily suspend an erase operation or a program operation currently in progress and perform the read command for the memory device according to the read command if the read command is a general read command.

According to various embodiments of the present disclosure, it is possible to prevent inefficiency in a storage device that may be caused by an external device transmitting a command for a read-ahead operation.

DETAILED DESCRIPTION

Hereinafter, exemplary embodiments of the present disclosure will be described in further detail with reference to the accompanying drawings.

Figure 1:
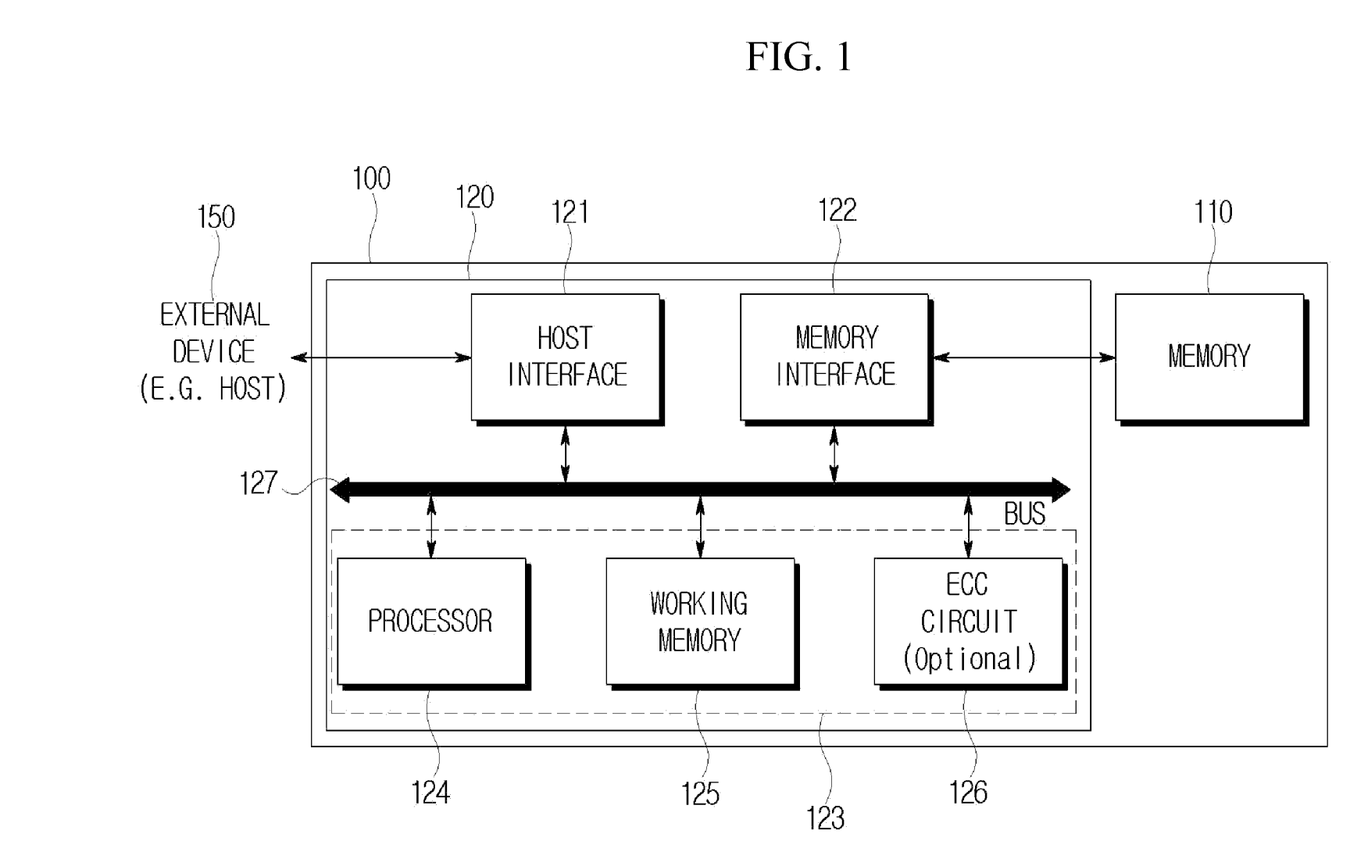
FIG. 1 is a schematic configuration diagram of a storage device according to an embodiment of the present disclosure.

FIG. 1 is a schematic configuration diagram of a storage device according to an embodiment of the present disclosure.

Referring to FIG. 1, a storage device 100 may include a memory device 110 that stores data and a controller 120 that controls the memory device 110. If necessary, additional components may be further included in the storage device 100.

The memory device 110 includes a plurality of memory blocks and operates in response to the control of the controller 120. Here, an operation of the memory device 110 may include, for example, a read operation, a program operation (also referred to as "write operation"), and an erase operation.

For example, the memory device 110 may be various types of non-volatile memories, such as a NAND flash memory, 3D NAND flash memory, a NOR flash memory, resistive random-access memory (RRAM), a phase-change memory (PRAM), magneto-resistive random access memory (MRAM), a ferroelectric random access memory (FRAM), or a spin transfer torque random access memory (STT-RAM) and the like.

The memory device 110 may be implemented as a three-dimensional array structure. Embodiments of the present disclosure may be applied not only to a flash memory in which a charge storage layer is formed of a conductive floating gate, but also to a charge trap type flash (CTF) in which a charge storage layer is formed of an insulating film.

The memory device 110 may receive commands and addresses from the controller 120 (also referred to as a memory controller), and may access a region selected by an address corresponding to memory cell arrays. That is, the memory device 110 may perform an operation indicated by a command with respect to a region in the memory cell arrays selected by an address.

For example, the memory device 110 may perform a program operation, a read operation, an erase operation, and the like. During a program operation, the memory device 110 may program data into a region selected by an address. During a read operation, the memory device 110 may read data from a region selected by an address. During an erase operation, the memory device 110 may erase data stored in a region selected by an address.

The controller 120 may control program (write), read, erase, and background operations of the memory device 110. Here, the background operation may include one or more operations from among garbage collection (GC), wear leveling (WL), read reclaim (RR), and bad block management (BBM) operations.

The controller 120 may control the operation of the memory device 110 according to a request of an external device (e.g., a host) located outside the storage device 100. On the other hand, the controller 120 may control the operation of the memory device 110 regardless of or in the absence of a request of an external device.

An external device may also be referred to as a host, and may be a computer, a UMPC (Ultra Mobile PC), a workstation, PDA (Personal Digital Assistant), a tablet, a mobile phone, a smart phone, an e-book, a PMP (portable multimedia player), a portable game machine, a navigation device, a black box, a digital camera, a DMB (Digital Multimedia Broadcasting) player, a smart television, a digital audio recorder, a digital audio player, a digital picture recorder, a digital picture player, a digital video recorder, a digital video player, a storage constituting a data center, one of various electronic devices constituting a home network, one of various electronic devices constituting a computer network, one of various electronic devices constituting a telematics network, a radio frequency identification (RFID) device, and a mobile device (e.g. vehicle, robot, drone) that travels on the ground, water or air under human control or autonomously.

The external device may include at least one operating system (OS). The operating system may generally manage and control functions and operations of an external device, and provide mutual operations between the external device and the storage device 100. The operating system may be divided into a general operating system and a mobile operating system according to the mobility of an external device.

Meanwhile, the controller 120 and an external device may be separate devices. In some cases, the controller 120 and an external device may be implemented as an integrated device. Hereinafter, for convenience of description, examples in which the controller 120 and an external device are separate devices will be described.

Referring to FIG. 1, the controller 120 may include a host interface 121, a memory interface 122, a control circuit 123, and the like.

The host interface 121 provides an interface for communication with an external device. For example, the host interface 121 may provide an interface that uses at least one among various interface protocols such as a Universal Serial Bus (USB) protocol, a multimedia card (MMC) protocol, a peripheral component interconnection (PCI) protocol, a PCI-express (PCI-E) protocol, an Advanced Technology Attachment (ATA) protocol, a Serial-ATA protocol, a Parallel-ATA protocol, a small computer small interface (SCSI) protocol, an enhanced small disk interface (ESDI) protocol, an Integrated Drive Electronics (IDE) protocol, a system management bus (SMBus) protocol, an inter-integrated circuit (I2C) protocol, an improved inter-integrated circuit (I3C) protocol, a proprietary protocol, and the like.

The control circuit 123 may receive a command through the host interface 121 and may perform an operation of processing the received command.

The memory interface 122 may be connected to the memory device 110 to provide an interface for communication with the memory device 110. That is, the memory interface 122 may be configured to provide an interface between the memory device 110 and the controller 120 in response to a control of the control circuit 123.

The control circuit 123 may control an operation of the memory device 110 by performing overall control of the controller 120. To this end, according to embodiments of the disclosure, the control circuit 123 may include a processor 124, a working memory 125, and an optional error detection and correction circuit (ECC Circuit) 126.

The processor 124 may control all operations of the controller 120.

The processor 124 may communicate with an external device through the host interface 121 and may communicate with the memory device 110 through the memory interface 122.

The processor 124 may perform a function of a flash translation layer (FTL). The processor 124 may translate a logical block address provided by an external device into a physical block address through a flash translation layer (FTL). The flash translation layer may receive a logical block address and translate it into a physical block address using a mapping table.

There are various address mapping methods that may be employed by the flash translation layer according to the mapping unit. Typical address mapping methods include a page mapping method, a block mapping method, and a hybrid mapping method.

The processor 124 may randomize data received from an external device. For example, the processor 124 may randomize data received from an external device using a set randomizing seed. The randomized data may be provided to the memory device 110 and programmed into the memory device 110.

The processor 124 may derandomize data received from the memory device 110 during a read operation. For example, the processor 124 may derandomize data received from the memory device 110 using a derandomizing seed. The derandomized data may be output to an external device.

The processor 124 may perform background functions for the memory device 110 such as garbage collection (GC), wear leveling (WL), and bad block management.

Garbage collection may be a function to collect data partially written into an existing memory block and move that data to another memory block in order to secure free space in the memory device 110 to record data when there is not enough space.

Wear-leveling may be a function to prevent excessive use of a specific block by writing data to all memory blocks of the memory device 110 in a distributed manner in order to prevent errors and data loss of the memory device 110 and to improve durability and stability of the product.

Bad block management may be a function to prevent data from being written to a bad block by detecting a bad block in the memory device 110 and replacing the bad block with a spare block when a spare block is available.

The processor 124 may control the operation of the controller 120 by executing firmware. In other words, the processor 124 may control overall operations of the controller 120 and execute (drive) firmware stored in the working memory 125 during booting. Hereinafter, an operation of the storage device 100 described in embodiments of the present disclosure may be implemented with the processor 124 executing firmware in which the corresponding operation is defined.

Firmware is a program being executed in the storage device 100 to drive the storage device 100 and may include various functional layers. For example, the firmware may include binary data in which codes for executing each of the above-mentioned functional layers are defined.

For example, the firmware may include a flash translation layer that performs a translation function between a logical block address transmitted from an external device to the storage device 100 and a physical block address of the memory device 110; a host interface layer (HIL) that receives and translates a command from the external device through the host interface 121 and delivers it to the flash translation layer; and a flash interface layer (FIL) that delivers a command instructed by the flash translation layer to the memory device 110.

Also, the firmware may include a garbage collection function, a wear leveling function, and a bad block management function.

Such firmware, for example, may be loaded into the working memory 125 from the memory device 110 or a separate non-volatile memory (e.g., ROM, NOR Flash) located outside the memory device 110. When executing a booting operation after power is turned on, the processor 124 may first load all or part of the firmware into the working memory 125.

The processor 124 may perform logic operations defined in the firmware loaded into the working memory 125 to control the overall operations of the controller 120. The processor 124 may store, in the working memory 125, a result of performing a logic operation defined in firmware. The processor 124 may control the controller 120 to generate a command or signal according to a result of performing a logic operation defined in the firmware. When part of the firmware, in which a logical operation to be performed is defined, is not loaded into the working memory 125, the processor 124 may generate an event (e.g., interrupt) for loading the corresponding part of the firmware into the working memory 125.

The processor 124 may load meta data required to drive the firmware from the memory device 110. Meta data is data for managing the memory device 110 and may include management information about user data stored in the memory device 110.

The firmware may be updated while the storage device 100 is being produced or while the storage device 100 is running. The controller 120 may download new firmware from an external device of the storage device 100 and/or update the existing firmware to a new firmware.

The working memory 125 may store firmware, program codes, commands, or pieces of data necessary to drive the memory controller 120. The working memory 125 may include at least one or more among, for example, a static RAM (SRAM), a dynamic RAM (DRAM), and/or a synchronous RAM (SDRAM) as a volatile memory.

The error detection/correction circuit 126 may be configured to detect error bits of target data using an error correction code and to correct the detected error bit(s). For example, the target data may be data stored in the working memory 125, data read from the memory device 110, or the like.

The error detection/correction circuit 126 may be implemented to decode data using the error correction code. The error detection/correction circuit 126 may be implemented using various code decoders. For example, the error detection/correction circuit 126 may be implemented with a decoder that performs nonsystematic code decoding or a decoder that performs systematic code decoding.

For example, the error detection/correction circuit 126 may detect error bit(s), sector by sector, with regard to each piece of read data. That is, each piece of read data may include multiple sectors. A sector may refer to a data unit smaller than the read unit (i.e., page) of a flash memory. Sectors constituting each piece of read data may correspond to each other via an address.

The error detection/correction circuit 126 may calculate a bit error rate (BER) and determine whether or not correction can be made sector by sector. For example, if the BER is higher than a reference value, then the error detection/correction circuit 126 may determine that the corresponding sector is uncorrectable or a "fail". If the BER is lower than the reference value, then the error detection/correction circuit 126 may determine that the corresponding sector is correctable or a "pass".

The error detection/correction circuit 126 may perform error detection and correction operations successively with regard to all pieces of read data. When a sector in the read data is correctable, the error detection/correction circuit 126 may omit the error detection and correction operations related to the corresponding sector with regard to the next piece of read data. After finishing error detection and correction operations with regard to all pieces of read data in this manner, the error detection/correction circuit 126 may detect a sector deemed uncorrectable towards the end of the operations. There may be one or more sectors deemed uncorrectable. The error detection/correction circuit 126 may deliver information (for example, address information) regarding the sectors deemed uncorrectable to the processor 124.

A bus 127 may be configured to provide a channel between the constituent elements 121, 122, 124, 125, and 126 of the memory controller 120. The bus 127 may include, for example, a control bus for delivering various kinds of control signals and commands, and a data bus for delivering various kinds of data.

Some of the elements of the above-mentioned constituent elements 121, 122, 124, 125, and 126 of the controller 120 may be omitted, or some of these elements may be integrated into a single element. In addition, the memory controller 120 may also contain one or more other elements in addition to the elements identified above.

Figure 2:
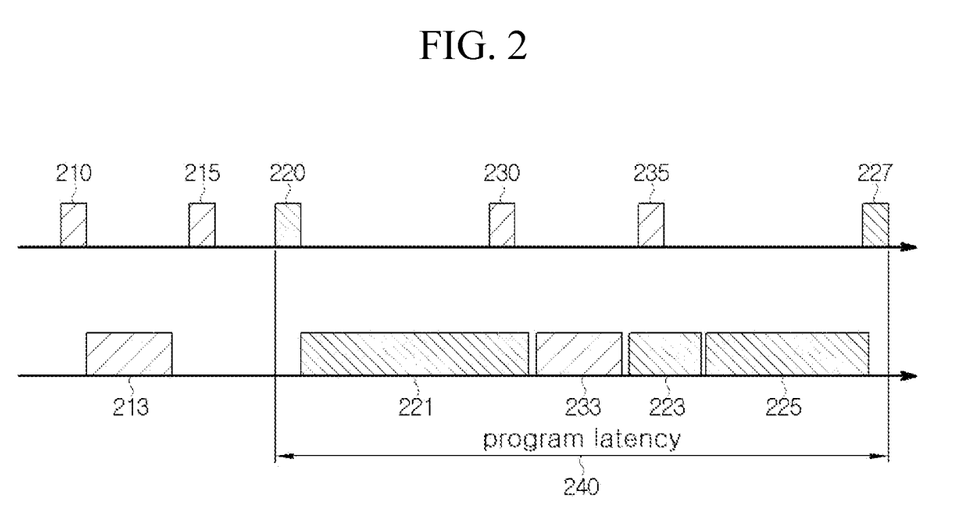
FIG. 2 is a diagram illustrating operations of a storage device in response to a command of an external device.

FIG. 2 is a diagram illustrating operations of a storage device in response to a command of the external device.

Referring to FIG. 2, an external device 150 of FIG. 1 may deliver a read command 210, a program command 220, and/or a read-ahead command 230 to the storage device 100 to request reading and storage of data. The read command 210 and the read-ahead command 230 delivered from the external device 150 may not be distinguishable by the storage device 100 according to the current interface protocol.

When the storage device 100 receives the read command 210 from the external device 150, the storage device 100 may read (213) the data requested by the external device 150 from the memory device 110 through internal processing, and then transmit (215) the data read to the external device 150.

In addition, when the storage device 100 receives the program command 220 from the external device 150, the storage device 100 may perform the erase operations 221 and 223, if necessary, through internal processing, and then perform the program operation 225 to store data transmitted by the external device in the memory device 110.

When the storage device 100 receives the program command 220, the storage device 100 may perform the program operation 225 after performing the erase operations 221 and 223 for the memory device 110. When the read command or the read-ahead command 230 is received during the erase operation 221 or the program operation 225, the storage device 100 may temporarily suspend the erase operation 221 and perform the read operation 233 first. In general, since the storage device 100 places a higher priority on a read operation than an erase or program operation, if the read operation needs to be performed while the erase or program operation is in progress, the storage device 100 temporarily suspends the erase or program operation and reads data from the memory device 110 through the read operation 233, then afterwards continues the erase operation or the program operation. After the read operation 233, the storage device 100 may transmit 235 the data resulting from the read-ahead command 230 to the external device 150.

The erase operation 221 suspended by the read command or the read-ahead command 230 is resumed after the read operation or the read-ahead command 230 is completed, and the storage device 100 may perform the erase operation 223 and transmit (227) a message indicating that the operations are completed to the external device 150.

As illustrated in FIG. 2, the read-ahead command 230 temporarily suspends an operation of the storage device 100 according to an earlier-received program command 220 that is in progress, and so that the latency of the program command 220 may increase. This extended latency may cause performance degradation in an application that executes the program command 220 in the external device 150.

Figure 3:
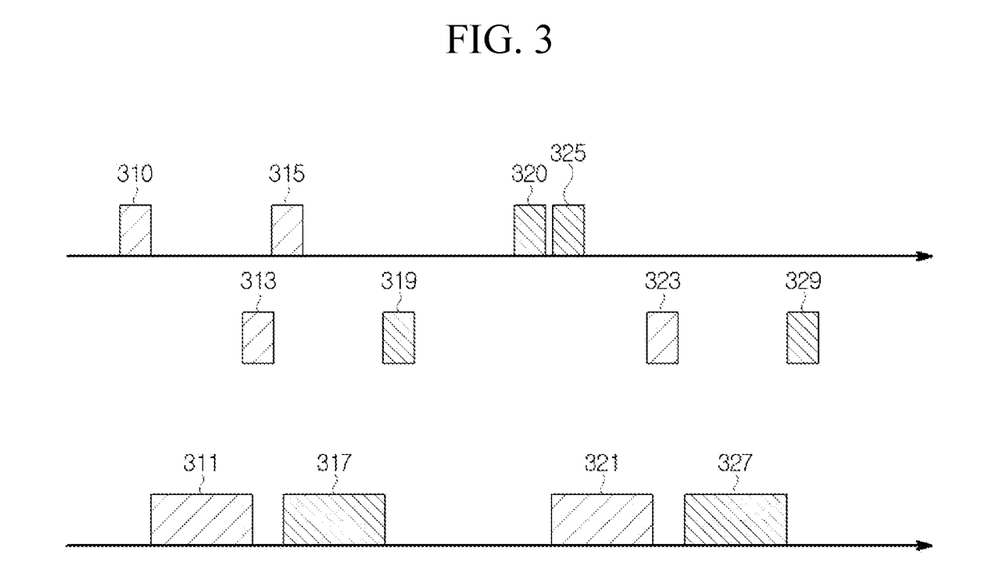
FIG. 3 is a diagram illustrating operations of a storage device according to a command of an external device when the storage device has its own read-ahead function.

FIG. 3 is a diagram illustrating operations of a storage device according to a command of an external device when the storage device has its own read-ahead function.

Referring to FIG. 3, an external device 150 may transmit a read command 310 and a read-ahead command 320 to a storage device 100 to obtain, in advance, data necessary for improving performance of the internal applications. According to embodiments of the disclosure, the read command 310 and the read-ahead command 320 transmitted by the external device 150 to the storage device 100 may not be distinguishable in the storage device 100 according to the current interface protocol.

When the storage device 100 receives the read command 310 from the external device 150, the storage device 100 may read (311) the data requested by the external device 150 from the memory device 110 through the internal processing and store (313) the data in a temporary internal buffer, and may transmit (315) the data to the external device 150.

In addition, when the storage device 100 has its own read-ahead function, the storage device 100 may internally generate a read-ahead command (not illustrated) in response to the read command 310 from the external device 150, perform a read operation 317 accordingly, and store (319) the read data in a temporary internal buffer.

Thereafter, in response to the read-ahead command 320 that is sent by the external device 150, the storage device 100 may transmit (325), to the external device 150, the data (319) that is read ahead and stored in the temporary buffer. This has an effect of reducing the latency resulting from a read-ahead command from the external device 150.

Because the storage device 100 cannot distinguish between read commands and read-ahead commands, the storage device 100 may also perform read-ahead functions for the read-ahead command 320 received from the external device 150. In response to the read-ahead command 320 from the external device 150, the storage device 100 may perform read operations 321 and 327 according to the internally generated read-ahead commands and store the read data in temporary internal buffers (323 and 329). However, the external device 150 has already obtained necessary data transmitted at 325 by the storage device 100, so the external device 150 does not need the results of read operations 321 and 327 generated by read-ahead command 320. Thus, inefficiency may occur in that data read by performing the read-ahead function in the storage device 100 uses up internal buffers 323 and 329 of the storage device 100, but the data is superfluous and ultimately discarded.

In order to solve the above-described inefficiency problem, the present disclosure first proposes a method for the storage device 100 to determine whether a command received from the external device 150 is a read command or a read-ahead command.

According to the present disclosure, it is possible to make the read command transmitted from the external device 150 to the storage device 100 include information indicating whether the corresponding read command is a general read command or a read-ahead command.

According to embodiments of the disclosure, it is possible to make the read command include information indicating whether it is a general read command or a read-ahead command, using a field whose purpose is not yet determined in the common command format of a submission queue entry used in the NVMe protocol.

Figure 4A:
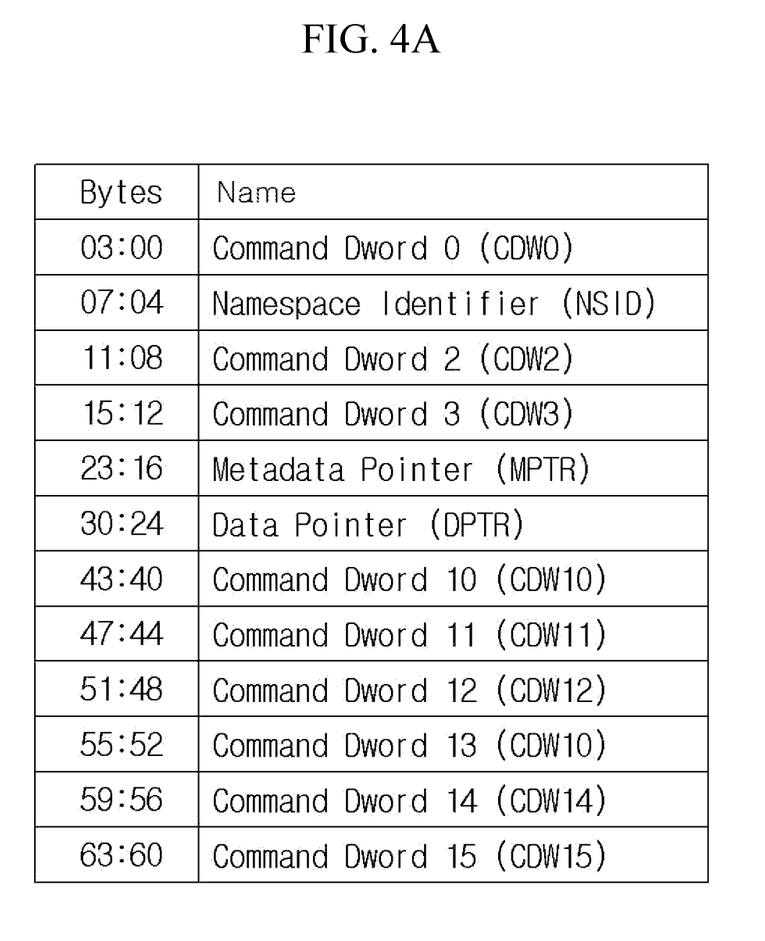
FIG. 4A is a diagram illustrating a configuration in a common command format of a submission queue entry used in the NVMe protocol according to an embodiment of the disclosure.
Figure 4B:
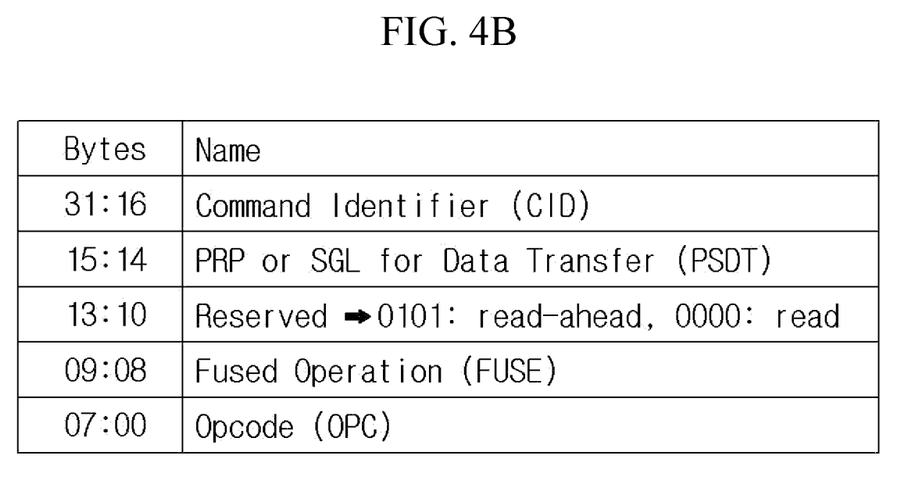
FIG. 4B is a diagram illustrating a specific configuration of a command dword 0 in a common command format of a submission queue entry used in the NVMe protocol according to an embodiment of the disclosure.

FIG. 4A is a diagram illustrating a configuration in a common command format of a submission queue entry used in the NVMe protocol according to an embodiment of the disclosure. FIG. 4B is a diagram illustrating a specific configuration of a command dword 0 in a common command format of a submission queue entry used in the NVMe protocol according to an embodiment of the disclosure.

The function of each field shown in FIGS. 4A and 4B is described in detail in NVM Express Base Specification Revision 2.0b issued on Jan. 6, 2022, which is incorporated herein by reference, and detailed descriptions are omitted in this disclosure unless necessary.

Referring to FIG. 4A, a common command format of a submission queue entry consists of 64 bytes. Several fields named as command dwords may be used to indicate specific information according to commands, and some fields have uses not yet determined. Accordingly, some fields (for example, CDW2 or CDW3), the uses for which have not yet been determined, may be set to include information indicating whether a read command is a general read command or a read-ahead command.

Referring to FIG. 4B, in an embodiment, bits 13 to 10 of a command dword 0 (CDW0) of a common command format of a Submission Queue Entry are reserved for later use of the bits, and the use of the bits is not specified in the current protocol regulations. As such, the reserved bits may be set to include information indicating whether a read command is a general read command or a read-ahead command. For example, the bits may be set to indicate a general read command if the value of bits 13 to 10 of CDW0 is "0000", and to indicate a read-ahead command if the value of bits 13 to 10 of CDW0 is "0101".

According to another embodiment, using fields without determined uses in a command UPIU (command UFS protocol information unit) transmitted to a storage device 100 in order for an external device 150 to read data in the UFS (Universal Flash Storage) protocol, it is possible to include, in the read command, the information indicating whether the read command is a general read command or a read-ahead command.

Figure 5:
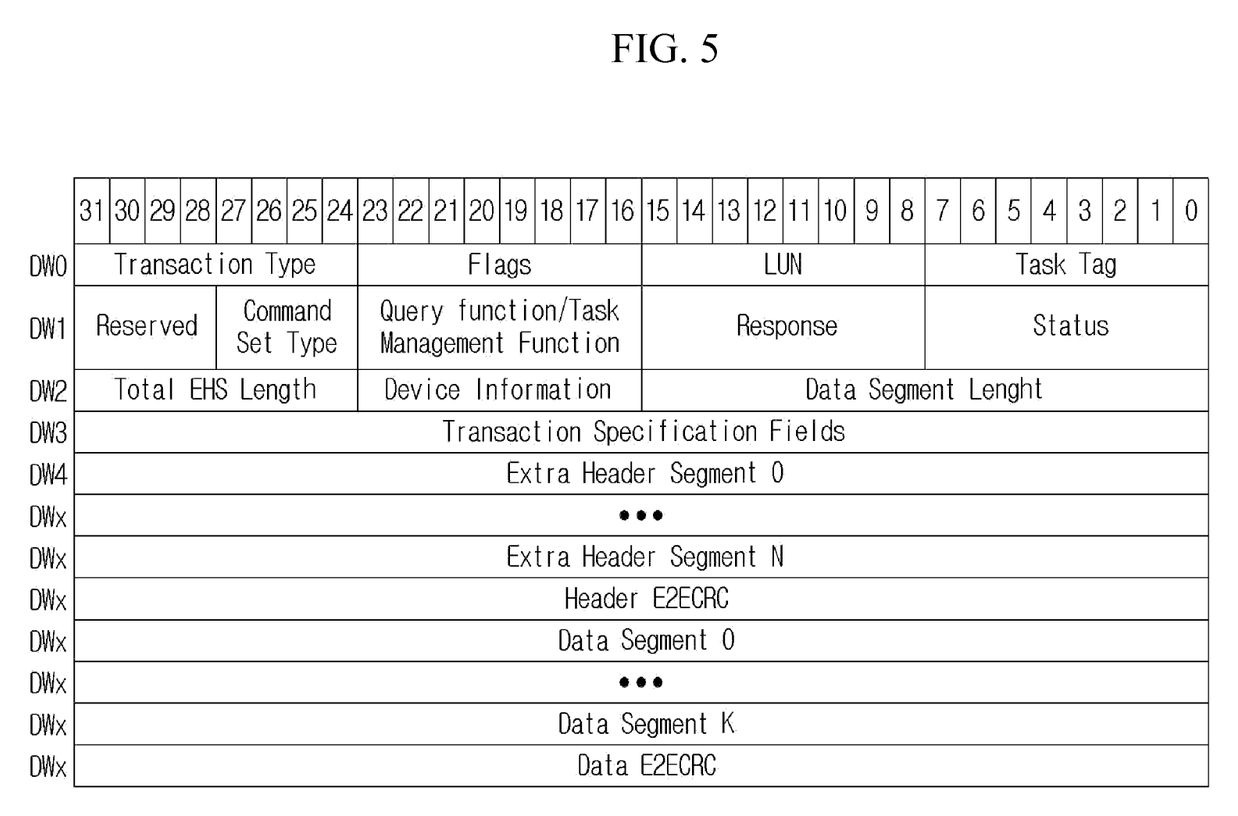
FIG. 5 is a diagram illustrating a general structure of a command UPIU of a UFS protocol according to an embodiment of the disclosure.

FIG. 5 is a diagram illustrating a general structure of a command UPIU of a UFS protocol according to an embodiment of the disclosure.

The function of each field shown in FIG. 5 is described in detail in universal flash storage (UFS) Version 4.0 issued by JEDEC in August 2022, which is incorporated herein by reference, and detailed descriptions thereof are omitted in this disclosure unless necessary.

Referring to FIG. 5, headers of a command UPIU include various fields, and a certain bit (e.g., bits 31 to 28 of DW1) is set as a reserved field because its purpose has not been determined. Therefore, this field may be set to include information indicating whether a read command is a general read command or a read-ahead command.

In this way, by updating a conventional message structure used in a protocol between an external device 150 and a storage device 100, it is possible to make a header of a message and the like indicate whether the read command is the general read command or the read-ahead command.

Based on whether the read command is the general read command or the read-ahead command, the storage device 100 may improve efficiency and prevent the degradation problem in the storage device 100 in the conventional methods illustrated in FIGS. 2 and 3 described above.

Figure 6A:
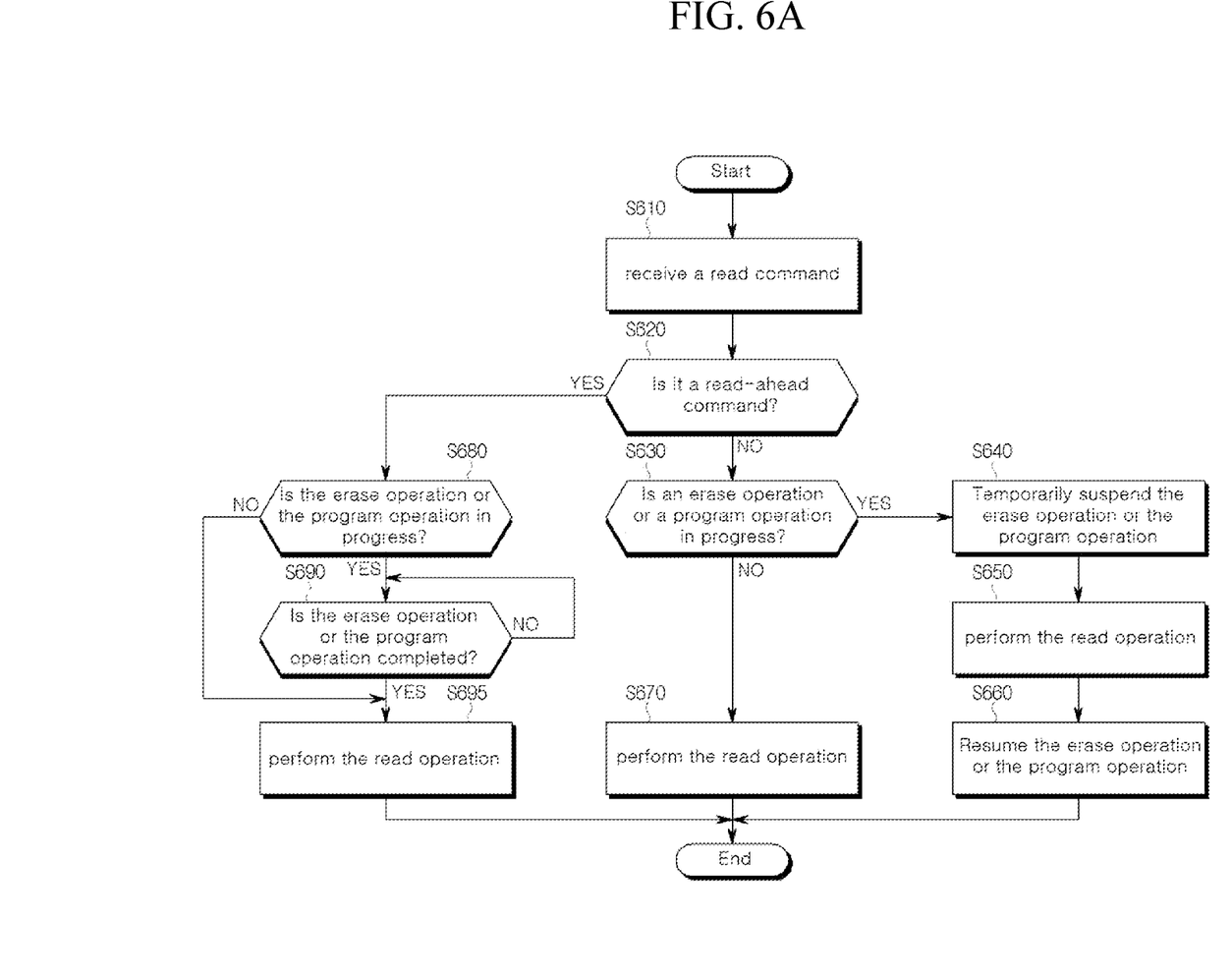
FIG. 6A and FIG. 6B are flowcharts illustrating read operations when a storage device receives a read command according to embodiments of the disclosure.
Figure 6B:
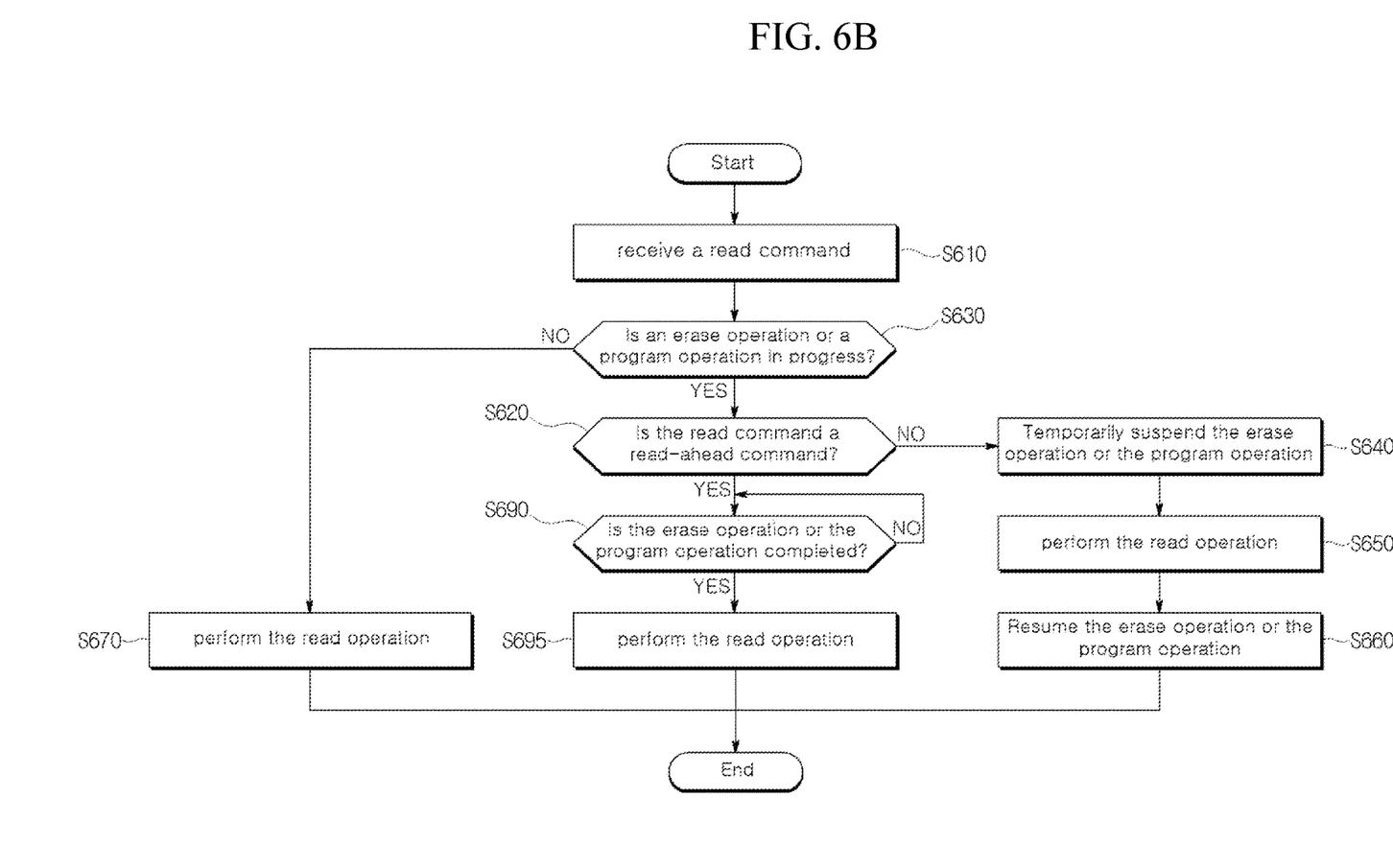

FIG. 6A and FIG. 6B are flowcharts illustrating read operations when a storage device receives a read command according to embodiments of the disclosure.

The difference between FIGS. 6A and 6B is that FIG. 6A checks first whether a received read command is a read-ahead command, while FIG. 6B checks first whether an erase operation or a program operation is currently in progress. After these checks, the operations may be the same.

Referring to FIG. 6A, in an operation S610, a storage device 100 may receive a read command from an external device 150.

In an operation S620, the storage device 100 may determine whether the received read command is a general read command or a read-ahead command. According to an embodiment, the storage device 100 may determine whether the read command received from the external device 150 is the general read command or the read-ahead command based on a value written in a specific field or specific bit of the read command received from the external device 150.

If the received read command is not a read-ahead command, then the storage device 100 may determine whether an erase operation or a program operation is currently in progress in an operation S630.

If an erase operation or a program operation is in progress, then the storage device 100 may temporarily suspend the erase operation or the program operation at S640, and obtain data from a memory device 110 based on the received read command in an operation S650, and resume the suspended erase operation or the program operation afterwards at S660.

If an erase operation or a program operation is not in progress in the operation S630, then the storage device 100 may immediately perform the read operation for obtaining data from the memory device 110 based on the received read command, in an operation S670.

Returning to the operation S620, if the storage device 100 determines that the read command received by the storage device 100 is a read-ahead command, then the storage device 100 may determine whether an erase operation or a program operation is in progress at an operation S680. If an erase operation or a program operation is in progress, then after the erase operation or the program operation is completed in an operation S690, the storage device 100 may perform the read operation for obtaining data from the memory device 110 based on the received read command in an operation S695. In the operation S680, if an erase operation or a program operation is not in progress, then the storage device 100 may immediately perform the read operation in the operation S695.

Here, the read operations at S650, S670, and S695 may be the same operation.

Referring to FIG. 6B, a storage device 100 may receive a read command from an external device 150 in the operation S610.

In the operation S630, the storage device 100 may determine whether an erase operation or a program operation is currently in progress. If determined that an erase operation or a program operation is not currently in progress, the storage device 100 may perform a read operation in the operation S670. According to an embodiment, if the storage device 100 is currently performing the read operation, then the storage device 100 may proceed to perform the read operation after completing the read operation in progress.

If the erase operation or the program operation is currently in progress, then the storage device 100 may determine whether the received read command is a general read command or a read-ahead command in the operation S620. According to an embodiment, the storage device 100 may determine whether the read command received from the external device 150 is the general read command or the read-ahead command based on a value written in a specific field or specific bit of the read command received from the external device 150.

If the storage device 100 determines that the received read command is not a read-ahead command, then the storage device 100 may temporarily suspend the erase operation or the program operation in the operation S640, and based on the received read command, the memory device 100 may perform the read operation for obtaining data from the memory device 110 in the operation S650. The suspended erase operation or program operation may be resumed in the operation S660.

If the storage device 100 determines that the received read command is the read-ahead command, then in an operation S690, the storage device 100 may determine whether the erase operation or the program operation is completed. If the erase operation or the program operation is completed, then the storage device 100 may perform, in an operation S695, based on the received read command, the read operation for obtaining data from the memory device 110.

Here, the read operations of the operation S650, operation S670, and operation S695 may be the same operation.

Figure 7:
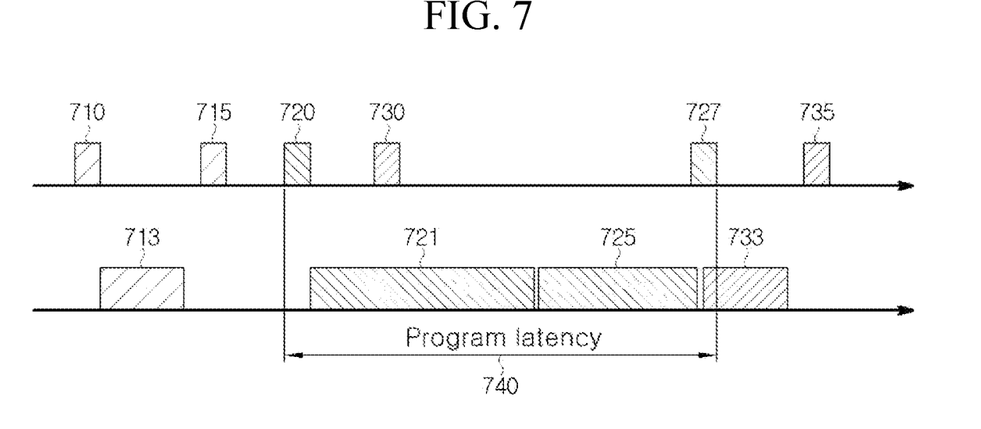
FIG. 7 is a diagram illustrating operations of a storage device in response to a read-ahead command of FIG. 6A or FIG. 6B according to embodiments of the disclosure.

FIG. 7 is a diagram illustrating operations of a storage device in response to a read-ahead command of FIG. 6A or FIG. 6B according to embodiments of the disclosure.

Referring to 6A and 7, a storage device 100 receives a read command 710 in operation S610, determines that the corresponding read command is a general read command in operation S620, and if determined that an erase operation or a program operation is not being performed in the operation S680, the storage device 100 may perform a read operation 713 in the operation S695 to read the data requested by an external device 150 from a memory device 110 and to transmit (715) the data to the external device 150.

When the storage device 100 receives a program command 720 from the external device 150 and receives the read-ahead command 730 while an erase operation 721 is being performed, the storage device 100 determines the command as the read-ahead command in the operation S620, and when the storage device 100 determines that the erase operation or the program operation is in progress in the operation S680, the storage device 100 may wait for the erase operation or the program operation to be completed in the operation S690.

When the erase operation 721 and program operation 725 are completed, the storage device 100 may obtain data from the memory device 110 by performing a read operation 733 based on a received read-ahead command 730 and transmit (735) the obtained data to the external device 150 in the operation S695.

Although the above example has been described based on FIG. 6A, substantially the same operations may be applied to the flowchart of FIG. 6B.

Comparing program latencies 240 and 740 in FIGS. 2 and 7 respectively, from the time the external device 150 transmits the program commands 220 and 720 to the time the external device 150 receives the program completion messages 227 and 727, it is seen that the program latency may be reduced when applying the method of FIG. 7. However, although reception 735 of the data requested by the read-ahead command 730 from the external device 150 may be delayed, the data requested by the read-ahead command 730 is not the data that is needed immediately but data that may be needed later, and thus latency to a certain extent may not affect performance.

Figure 8:
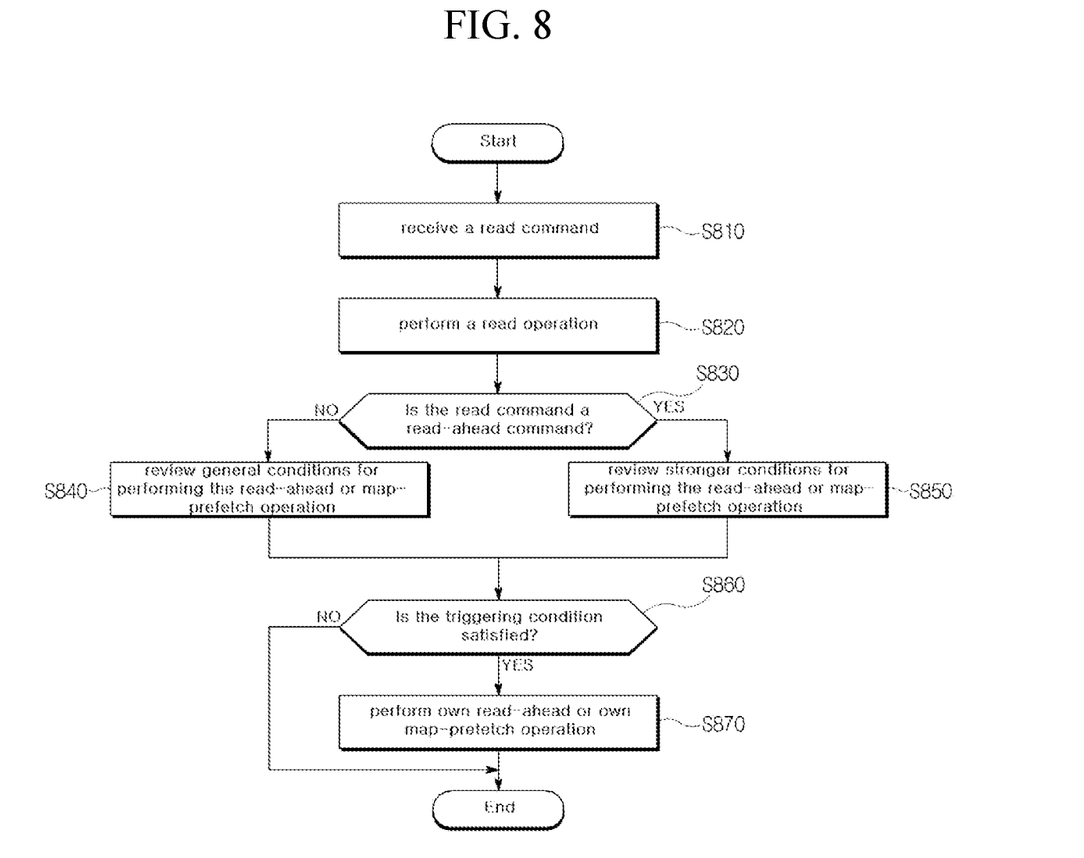
FIG. 8 is a flowchart illustrating a storage device that performs its own read-ahead operation or map-prefetch operation when the storage device receives a read command according to embodiments of the disclosure.

FIG. 8 is a flowchart illustrating a storage device that performs its own read-ahead operation or map-prefetch operation when the storage device receives a read command according to embodiments of the disclosure.

Referring to FIG. 8, in an operation S810, a storage device 100 may receive a read command from an external device 150.

In an operation S820, the storage device 100 may perform a read operation based on the received read command. According to an embodiment, the storage device 100 may perform the read operation according to the flowchart illustrated in FIG. 6A or FIG. 6B. For example, if the received read command is a read-ahead command, then the storage device 100 may perform the read operation after the erase operation and the program operation are completed, and if the received read command is a general read command, the storage device 100 may temporarily suspend the erase operation and/or program operation and perform the read operation according to the received read command.

Before, after, or simultaneously with performing the read operation of the operation S820, the storage device 100 may determine whether the received read command is a read-ahead command in an operation S830.

In the operation S830, the storage device 100 may determine whether the received read command is the read-ahead command. In addition, depending on whether the command is the general read command or the read-ahead command, the storage device 100 may change its own read-ahead or map-prefetch condition.

In the operation S830, if the read command received by the storage device 100 is determined to be a general read command, then the storage device 100 may review general conditions for performing the read-ahead or map-prefetch operation in an operation S840. In the operation S830, if the read command received by the storage device 100 is determined to be a read-ahead command, then the storage device 100 may review stronger conditions for performing the read-ahead or map-prefetch operation in an operation S850. Here, conditions for performing the read-ahead operation and conditions for map-prefetch operation may be different from each other.

Conditions (e.g., triggering conditions) for performing the read-ahead or map-prefetch operation may be those associated with a high possibility of the external device 150 requesting subsequent data, based on the past read operations of the external device 150. Examples may include conditions based on the past read operations of the external device 150, or conditions based on read commands which only read a portion of the first part of the data, after data has been previously stored in subsequent addresses. In such instances, the stronger triggering conditions may be conditions in which the external device 150 is more likely to request subsequent data compared to general triggering conditions. According to an embodiment, a stronger triggering condition may include a condition that disables triggering.

Based on the result of reviewing the general triggering condition in the operation S840, or the result of reviewing the stronger triggering condition in the operation S850, the storage device 100 may determine whether the triggering condition is satisfied in an operation S860.

If it is determined that the triggering condition is not satisfied in the operation S860, then the storage device 100 may end an operation corresponding to the received read command without performing an additional own read-ahead operation or map-prefetch operation.

If it is determined that the triggering condition is satisfied in the operation S860, then the storage device 100 may perform its own read-ahead operation or map-prefetch operation in an operation S870.

Figure 9:
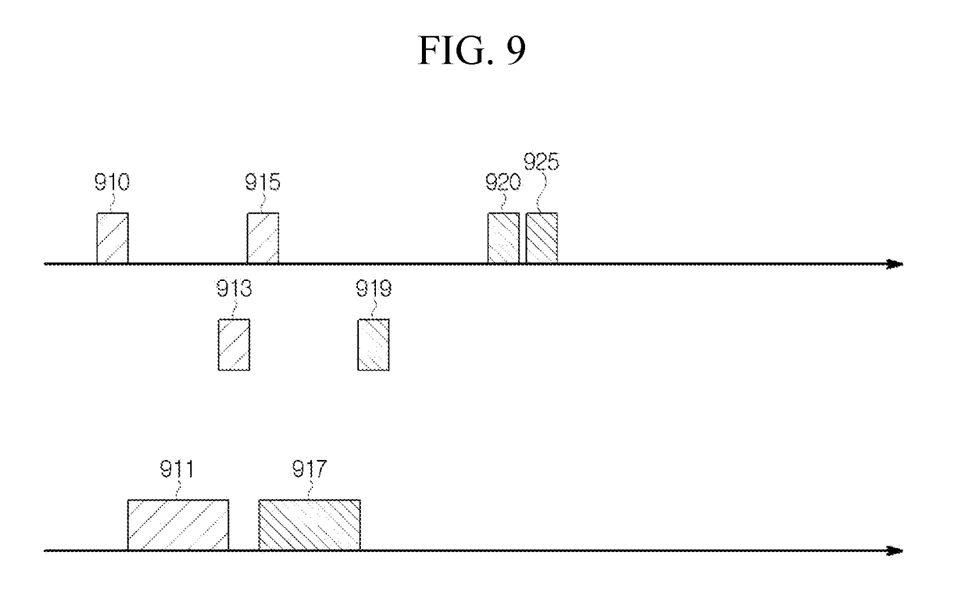
FIG. 9 is a diagram illustrating operations of a storage device in response to a read-ahead command of FIG. 8 according to embodiments of the disclosure.

FIG. 9 is a diagram illustrating operations of a storage device in response to a read-ahead command of FIG. 8 according to embodiments of the disclosure.

Referring to FIGS. 8 and 9, a storage device 100 may receive a read command 910 in the operation S810, perform a read operation 911 in response to the received read command in the operation S820, read the data requested by an external device 150 from a memory device 110, store the read data 913 in a temporary internal buffer, and transmit (915) the data to the external device 150. In addition, the storage device 100 may determine the corresponding read command as the general read command in the operation S830, and review the general condition of the read-ahead or map-prefetch operation in the operation S840.

In the example of FIG. 9, the storage device 100 determines that the triggering condition is satisfied in the operation S860 as a result of reviewing the operation S840, and may perform its own read-ahead operation 917 in the operation S870, and may store the read data 919 in the internal buffer. Alternatively, the storage device 100 may perform a map-prefetch operation and store the read map information in the internal buffer.

Thereafter, the storage device 100 may receive a read command 920, which is processed in the operation S810 and a read operation 911 performed in response to the read command received in the operation S820. In this case, the corresponding read command 920 is the read-ahead command, and may be of the same address as the address of data stored by the storage device 100 in the temporary buffer after the storage device 100 performed its own read-ahead operation. Accordingly, the storage device 100 may transmit (925) the data stored in the temporary buffer to the external device without an additional read operation on the memory device 110.

The storage device 100 may determine the corresponding read command as a read-ahead command in the operation S830 and review for a stronger condition of the read-ahead or map-prefetch operation in the operation S840.

In the example of FIG. 9, if the storage device 100 determines that the triggering condition is not satisfied in the operation S860 as a result of reviewing of the operation S850, the storage device 100 may end the response without performing an additional own read-ahead operation or map-prefetch operation.

According to another embodiment, if it is determined that the triggering condition is satisfied in the operation S860 as a result of reviewing of the operation S850, the storage device 100 may perform own read-ahead operation in the operation S870 and store data that is read in the internal buffer. Alternatively, the storage device 100 may perform the map-prefetch operation and store the map information that is read in the internal buffer.

Compared to FIG. 3, the operation of the storage device 100 according to FIG. 8 may prevent an inefficient problem of the conventional method in that read operations 321 and 327 and data obtained by the read operations are temporarily stored in the buffers 323 and 329 and then continuously maintained, by performing its own read-ahead operation or the map-prefetch operation in response to the read-ahead command based on a stronger triggering condition.

In the present disclosure, the read command received from the external device is configured to include a field or bit for determining whether the read command is the general read command or the read-ahead command, so that operational efficiency in the storage device 100 can be improved.

Various embodiments of the present disclosure recognize the above-described problem and aim to provide a storage device that can prevent inefficiency caused by a read-ahead operation.

What is claimed is:

1. A memory controller, comprising:
a controller configured to:
receive a read command from an external device and determine whether the read command is a general read command or a read-ahead command;
continue an erase operation or a program operation currently in progress if the read command is the read-ahead command; and
temporarily suspend the erase operation or the program operation currently in progress and process the read command if the read command is the general read command.

2. The memory controller of claim 1,
wherein the controller is configured to:
determine whether its own read-ahead operation or own map-prefetch operation is necessary based on a first condition if the read command is the general read command, and if determined necessary, perform its own read-ahead operation or own map-prefetch operation; and
determine whether its own read-ahead operation or own map-prefetch operation is necessary based on a second condition if the read command is the read-ahead command, and if determined necessary, perform its own read-ahead operation or own map-prefetch operation.

3. The memory controller of claim 1,
wherein the read command received by the controller comprises information indicating whether the read command is the general read command or the read-ahead command.

4. The memory controller of claim 3,
wherein the information indicating whether the read command is the general read command or the read-ahead command is included in a preset area within a read command message transmitted according to an interface protocol established between the external device and the controller.

5. The memory controller of claim 4,
wherein the preset area comprises at least one among bits defined as reserved fields in the read command message transmitted according to the interface protocol.

6. A method for operating a memory controller, comprising:
receiving a read command from an external device;
determining whether the read command is a general read command or a read-ahead command;

determining whether the memory controller is performing an erase operation or a program operation; and when the read command is the read-ahead command, performing the erase operation or the program operation and performing a read operation for a memory device according to the read command after completing the erase operation or the program operation.

7. The method for operating a memory controller of claim 6, further comprising:

when the read command is the general read command, performing the read operation for the memory device according to the read command after temporarily suspending the erase operation or the program operation.

8. The method for operating a memory controller of claim 7, further comprising:

when the read command is the general read command, determining whether an own read-ahead operation or an own map-prefetch operation is necessary based on a first condition, and performing the own read-ahead operation or the own map-prefetch operation when determined to be necessary; and when the read command is the read-ahead command, determining whether the own read-ahead operation or the own map-prefetch operation is necessary based on a second condition, and performing the own read-ahead operation or the own map-prefetch operation when determined to be necessary.

9. The method for operating a memory controller of claim 6, wherein the determining whether the read command is the general read command or the read-ahead command comprises:

determining whether the read command is the general read command or the read-ahead command based on information included in a preset area within a read command message transmitted according to an interface protocol established between the external device and the memory controller.

10. A storage device, comprising:
a non-volatile memory device; and
a controller configured to control an erase operation, a program operation, and a read operation to be performed on the memory device;

receive a read command from an external device and determine whether the read command is a general read command or a read-ahead command;

continue an erase operation or a program operation currently in progress if the read command is the read-ahead command; and temporarily suspend an erase operation or a program operation currently in progress and perform the read command for the memory device according to the read command if the read command is the general read command.

11. The storage device of claim 10,
wherein the controller is further configured to determine whether its own read-ahead operation or own map-prefetch operation is necessary based on a first condition if the read command is the general read command, and if determined necessary, perform its own read-ahead operation or own map-prefetch operation; and determine whether its own read-ahead operation or own map-prefetch operation is necessary based on a second condition if the read command is the read-ahead command, and if determined necessary, perform its own read-ahead operation or own map-prefetch operation.

12. The storage device of claim 10,
wherein the controller determines whether the read command is the general read command or the read-ahead command based on information included in a preset area within a read command message transmitted according to an interface protocol established between the external device and the controller.

13. The storage device of claim 12,
wherein the controller determines whether the read command is the general read command or the read-ahead command based on information displayed in at least one among bits defined as reserved fields in the read command message transmitted according to the interface protocol.

* * * * *

(12) SUPPLEMENTAL EXAMINATION CERTIFICATE

United States Patent  
Park et al.

(10) Number: US 12,169,649 F1  
(45) Certificate Issued: Jan. 14, 2026

Control No.: 96/050,121

Filing Date: Dec. 19, 2025

Primary Examiner: Luke S. Wassum

No substantial new question of patentability is raised in the request for supplemental examination. See the Reasons for Substantial New Question of Patentability Determination in the file of this proceeding.

(56) Items of Information

U.S. PATENT DOCUMENTS

| | | |
|---|---|---|
| 2020/0073135 | 3/2021 | Palmer |
| 2021/0201571 | 6/2020 | Jung et al. |